(12) United States Patent
Patel

(10) Patent No.: US 12,501,011 B2
(45) Date of Patent: Dec. 16, 2025

(54) METHOD AND PROCESSING UNIT FOR CONTROLLING FIELD OF VIEW OF A USER IN AN IMMERSIVE ENVIRONMENT

(71) Applicant: ZEALITY INC, Pleasanton, CA (US)

(72) Inventor: Dipak Mahendra Patel, Pleasanton, CA (US)

(73) Assignee: Zeality Inc, Pleasanton, CA (US)

( * ) Notice: Subject to any disclaimer, the term of this patent is extended or adjusted under 35 U.S.C. 154(b) by 150 days.

(21) Appl. No.: 18/512,081

(22) Filed: Nov. 17, 2023

(65) Prior Publication Data

US 2025/0168308 A1 May 22, 2025

(51) Int. Cl.
*H04N 13/117* (2018.01)
*G06T 5/50* (2006.01)
*H04N 5/50* (2006.01)
*H04N 13/351* (2018.01)

(52) U.S. Cl.
CPC ............ *H04N 13/117* (2018.05); *G06T 5/50* (2013.01); *H04N 13/351* (2018.05); *G06T 2207/20221* (2013.01)

(58) Field of Classification Search
CPC .... H04N 13/117; H04N 13/351; G06F 3/011; G06F 3/012; G06F 3/016; G06F 3/017; G06T 5/50; G06T 2207/20221
See application file for complete search history.

(56) References Cited

U.S. PATENT DOCUMENTS

| | | | |
|---|---|---|---|
| 11,611,739 B2 * | 3/2023 | Han | H04N 5/445 |
| 11,640,700 B2 | 5/2023 | Zou et al. | |
| 11,868,672 B1 * | 1/2024 | Dehkordi | G06F 9/451 |
| 12,009,088 B2 * | 6/2024 | Thompson | G06V 20/20 |
| 12,307,066 B2 * | 5/2025 | Sorrentino, III | G06F 3/04815 |
| 2023/0056779 A1 * | 2/2023 | Alam | G06V 20/20 |
| 2023/0237192 A1 | 7/2023 | Kahan et al. | |
| 2024/0385436 A1 * | 11/2024 | Dehkordi | G06F 3/012 |

* cited by examiner

*Primary Examiner* — Vijay Shankar
(74) *Attorney, Agent, or Firm* — Riyon Rae Harding

(57) ABSTRACT

Method, processing unit, and non-transitory computer-readable medium for controlling view of user in immersive environment. Input, in form of an aperture, is received from presenter to control the view. A real-time scene is analyzed to identify viewable objects and spatial image layers are created based on the aperture. Further, by sequentially combining the plurality of spatial image layers, a view-controlled scene is generated for the at least one attendee. The view of the at least one attendee is controlled by replacing the real-time scene with the view-controlled scene in the immersive environment.

12 Claims, 14 Drawing Sheets

METHOD AND PROCESSING UNIT FOR CONTROLLING FIELD OF VIEW OF A USER IN AN IMMERSIVE ENVIRONMENT

FIELD OF THE PRESENT INVENTION

Embodiments of the present invention generally relate to modifying field of view of a user in an immersive environment. In particular, embodiments of the present invention relate to a method and a processing unit for dynamically controlling the view of a user by a presenter in the immersive environment.

BACKGROUND OF THE DISCLOSURE

An immersive environment, being experienced by users, may be rendered with content comprising multiple scenes displayed sequentially to the user. The user viewing a scene at an instant of time has the control to change the view. Specifically, in a 360° view of an immersive environment, based on gestures of the user, the view of the user may change within the 3600 views.

A U.S. Pat. No. 11,640,700B2 discloses methods and systems for rendering virtual overlay in an extended reality environment to a user. The user is provided with an option to define a virtual viewfinder which restricts or focuses the user's view to portion of field of view enclosed by the virtual viewfinder. Therefore, there is a need for a method and processing unit which teaches to dynamically extract contextual data of the immersive environment in real-time and use the contextual data to modify and render the content to each user as per their preferences. In the U.S. Pat. No. 11,640,700B2, shape of the virtual viewfinder may be selectable by the user from a set of predefined shapes. The virtual viewfinder is displayed as a virtual shape within the field of view. The user may have an option to modify the size and/or location of the virtual viewfinder in the field of view. The size, shape and location of the virtual viewfinder represents the shape that will be used to define the spatial boundary, and the portion of the field of view enclosed by the virtual viewfinder will be region of interest within defined spatial boundary. The portion of the FOV outside of the virtual viewfinder may be blurred out or faded out, for example, to draw the user's focus to the virtual viewfinder.

In US patent application US20230237192A1, it is disclosed to restrict presentation of private virtual objects using privacy settings. It is further disclosed that the privacy settings may be applied to one or more virtual objects, one or more locations in a physical environment, and/or in association with one or more physical objects present in the physical environment. This may allow applying privacy settings based on location (e.g., such that moving virtual object to and from private locations may classify and/or declassify virtual objects as private), applying privacy settings based on a virtual object (e.g., independent of location), and/or applying privacy settings based on proximity to a physical object.

In the conventional systems and methods, controlling of the view of a user is based on inputs from the user itself. In a scenario where there are multiple users within an immersive environment, specifically with one of the multiple users being a presenter/a host, an option to control field of view of other users may not be provisioned. For some scenarios, for example, in a classroom with a lecturer and multiple students, there may be a need for the lecturer to control the display or field of view of the students. None of the existing systems and methods teach to provide an option to a presenter to control the view and restrict visibility of the users in an immersive environment.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for controlling field of view of a user in an immersive environment. Initially, an input to control a view of a content rendered to at least one attendee from one or more attendees within the immersive environment is received. The input is provided in form of an aperture with a predefined shape by a presenter of the immersive environment. Further, a real-time scene indicating current field of view of the at least one attendee within the immersive environment is dynamically obtained. The real-time scene is analyzed to identify one or more viewable objects within the real-time scene, based on the input. Plurality of spatial image layers are created based on the aperture, the one or more viewable objects and one or more additional objects. A first image layer of the plurality of spatial image layers comprises the aperture with the predefined shape and the one or more viewable objects within the aperture, a second image layer of the plurality of spatial image layers comprises remaining objects, other than the one or more viewable objects, of the real-time scene. The second image layer restricts view of the remaining objects to the at least one attendee. A third image layer of the plurality of spatial image layers comprises the one or more additional objects. By sequentially combining the plurality of spatial image layers, a view-controlled scene is generated for the at least one attendee. The view of the at least one attendee is controlled by replacing the real-time scene with the view-controlled scene in the immersive environment.

In a non-limiting embodiment, when the view of the at least one attendee is 360° view, the current field of view is a spherical view from one of within sphere and outside the sphere of the 360° view.

In a non-limiting embodiment, the view-controlled scene comprises the first image layer proximal to the at least one attendee, amongst other layers of the plurality of spatial image layers.

In a non-limiting embodiment, the second image layer is one of blurred image, monochrome image and blacked out image.

In a non-limiting embodiment, the aperture is one of a virtual aperture drawn by the presenter, a graphical representation selected by the presenter or a physical entity embedded with a wearable of the at least one attendee.

The features and advantages of the subject matter hereof will become more apparent in light of the following detailed description of selected embodiments, as illustrated in the accompanying FIGUREs. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
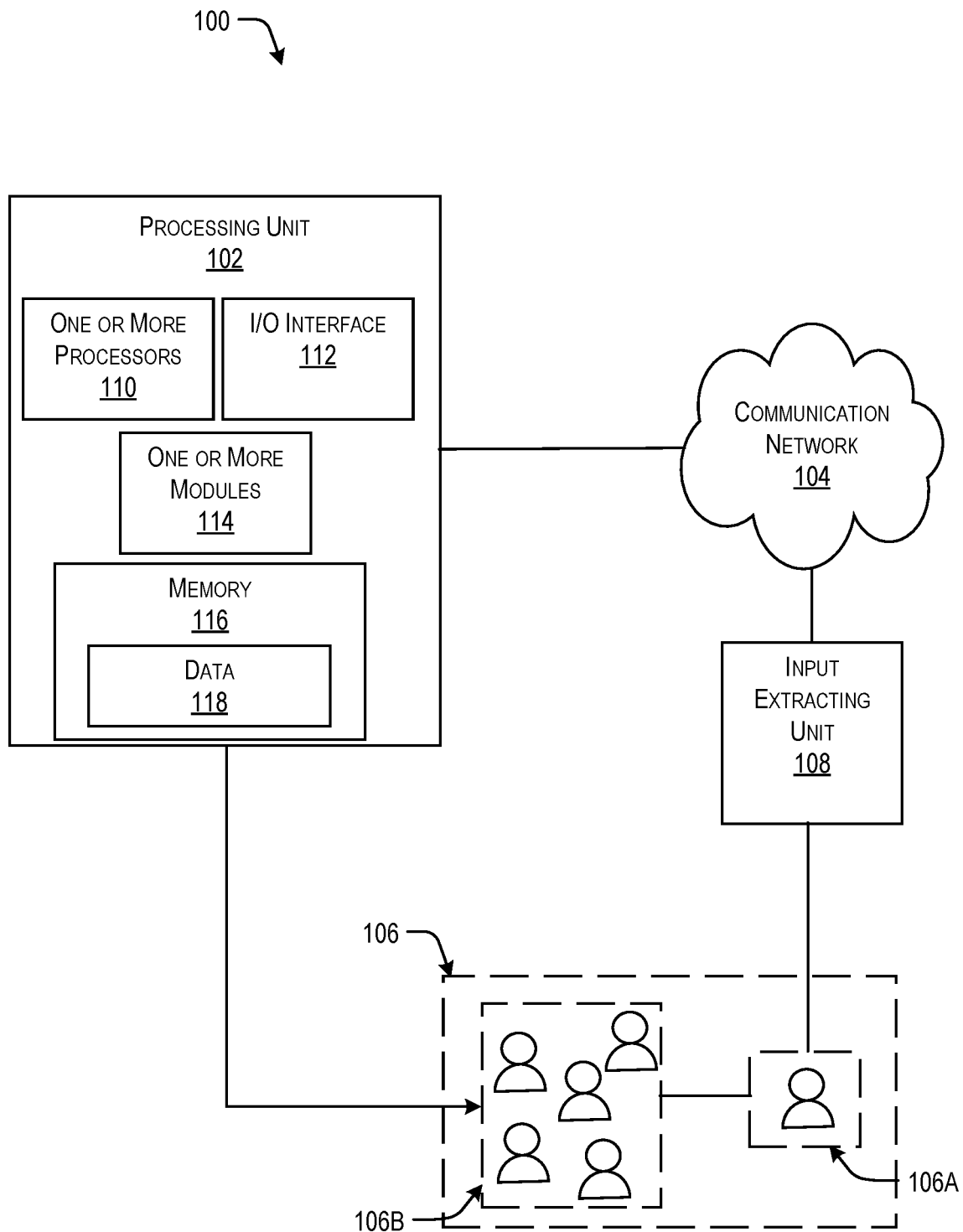
FIG. 1 illustrates an exemplary environment with a processing unit for controlling field of view of a user in an immersive environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details to provide a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, a processing unit, and a non-transitory computer-readable medium for controlling field of view of a user in an immersive environment. Presenter is provided an option to input which is in form of an aperture. The aperture may be a defining boundary within which the user is enabled to view the objects. Along with the objects of real-time scene within the aperture, the user is also displayed with additional objects related to commerce, engagement, advertisement, brand activation and so on.

FIG. 1 illustrates an exemplary environment 100 with processing unit 102 for controlling field of view of a user in an immersive environment, in accordance with an embodiment of the present invention. As shown in FIG. 1, the exemplary environment 100 comprises the processing unit 102, a communication network 104, a plurality of users 106 and an input extraction unit 108. The plurality of users 106 of the immersive environment may include a presenter 106A and one or more attendees 106B. In an embodiment, the presenter 106A may present content to the one or more attendees 106B in the immersive environment. In another embodiment, the presenter may be a host of the immersive environment. The exemplary environment 100 may be the immersive environment to which the plurality of users 106 are connected. In an embodiment, the immersive environment may be any environment that renders immersive content to the plurality of users 106. The immersive environment may be but is not limited to, an extended reality environment/immersive environment, a live-telecast environment, a content streaming environment, a visual communication environment, an online gaming environment, virtual 360° view of a scene, and so on. The content rendered to the plurality of users 106 may include, but is not limited to, at least one of video data, audio data, image data, text data, graphics data, and so on. Usually, the presenter 106A may be presenting the content to the one or more attendees 106B in such an environment. Alternatively, the presenter 106A and the one or more attendees 106B amongst the plurality of users 106 may not be pre-defined. Based on access provided to the plurality of users 106 and the requirements, any user, amongst the plurality of users 106, may be the presenter 106A and others may be the one or more attendees 106B, at any instant of time during rendering of the content. In an embodiment, the immersive environment may be a real-time communication session established amongst the plurality of users 106. The content may be but is not limited to, computer-generated data, real-time dynamically generated data, replayed data, pre-defined data, pre-stored data, live telecast data, images or video captured in real-time, and so on, that may be presented to the one or more attendees 106B by the presenter 106A. In an embodiment, the content may be a scene which is created by overlapping or concatenating digital images of the scene. In an embodiment, the plurality of users 106 may be connected to the immersive environment via user devices. The user devices may be but are not limited to, at least one of a smartphone, a head-mounted device, smart glasses, a television, a PC, a tablet, a laptop, and so on. In an embodiment, each of the plurality of users 106 may be associated with a dedicated user device. In an alternate embodiment, the at least one presenter 106A may be associated with a dedicated user device, and the one or more attendees 106B may be associated with one or more user devices.

The proposed processing unit 102 and method may be implemented in such an environment that renders the content to the plurality of users 106. The content may be rendered to the user devices of the plurality of users 106. The processing unit 102 may be configured to control the field of view of a user amongst the plurality of users 106. In an embodiment, the processing unit 102 may be communicatively coupled with the user devices of the plurality of users 106. The processing unit 102 may communicate with user device associated with the user to control the field of view of the user. In an embodiment, the processing unit 102 may be implemented as a cloud-based server that is configured to communicate with each of the user devices, for controlling the field of view. In an alternate embodiment, the processing unit 102 may be part of a user device associated with the at least one presenter 106A (not shown in the Figure). In such embodiment, the processing unit 102 may be configured to communicate with the user devices of the one or more attendees 106B and may be configured to render the modified scene to the user amongst the presenter 106A and the one or more attendees 106B.

In an embodiment, for controlling the field of view, the processing unit 102 may be configured to function in real-time, when the content is rendered to the plurality of users 106. In an embodiment, the processing unit 102 may be configured to function when the at least one presenter 106A is presenting the content to the one or more attendees 106B. During presentation of the content, at every instant of time, the real-time scene rendered to the user is controlled in accordance with the input received from the presenter 106A. In another embodiment, the aperture may be predefined by the presenter. In such cases, the real-time scene is processed prior to rendering to the user and then dynamically displayed to the user.

Further, the processing unit 102 may be in communication with the input extracting unit 108. The input extracting unit 108 may be configured to extract input provided by the presenter 106A. The controlling of the field of view of the user may be based on the input extracted by the input extracting unit 108. In the present invention, the input is provided by the presenter 106A. The input is in form of an aperture with a predefined shape. In an embodiment, the aperture may be a virtual aperture drawn by the presenter 106A. In another embodiment, the aperture may be a graphical representation selected by the presenter. In an alternate embodiment, the aperture may be a physical entity embedded with a wearable/user device of a user whose field of view is to be controlled by the presenter 106A. In an embodiment, the input extracting unit 108 may be an equipment which allows the presenter 106A to provide the input. For example, the input extracting unit 108 may be a control device, joystick, touch pad or a mouse through which the presenter 106A may draw or select the aperture. In such case, the input extracting unit 108 may be part of the user device of the presenter 106A. In an alternate embodiment, the input extracting unit 108 may be a monitoring unit which monitors the actions/gestures of the user to extract the input. The presenter 106A may outline the aperture in field of view of the presenter 106A. The input extracting unit 108 may be configured to monitor the outline and define the aperture to control field of view of the user. In an embodiment, the presenter 106A may be provided with an option indicating graphical representations with different shapes of the aperture. The presenter 106A may select one of the shapes. The selected shape may be extracted as the input by the of the input extracting unit 108. Thus, the aperture may be defined to be with the shape selected by the presenter 106A.

In an embodiment, the processing unit 102 may be connected with the user devices associated with the plurality of users 106, and the input extracting unit 108 via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user devices and the input extracting unit 108 via a corresponding dedicated communication network (not shown in FIGS.).

Figure 2:
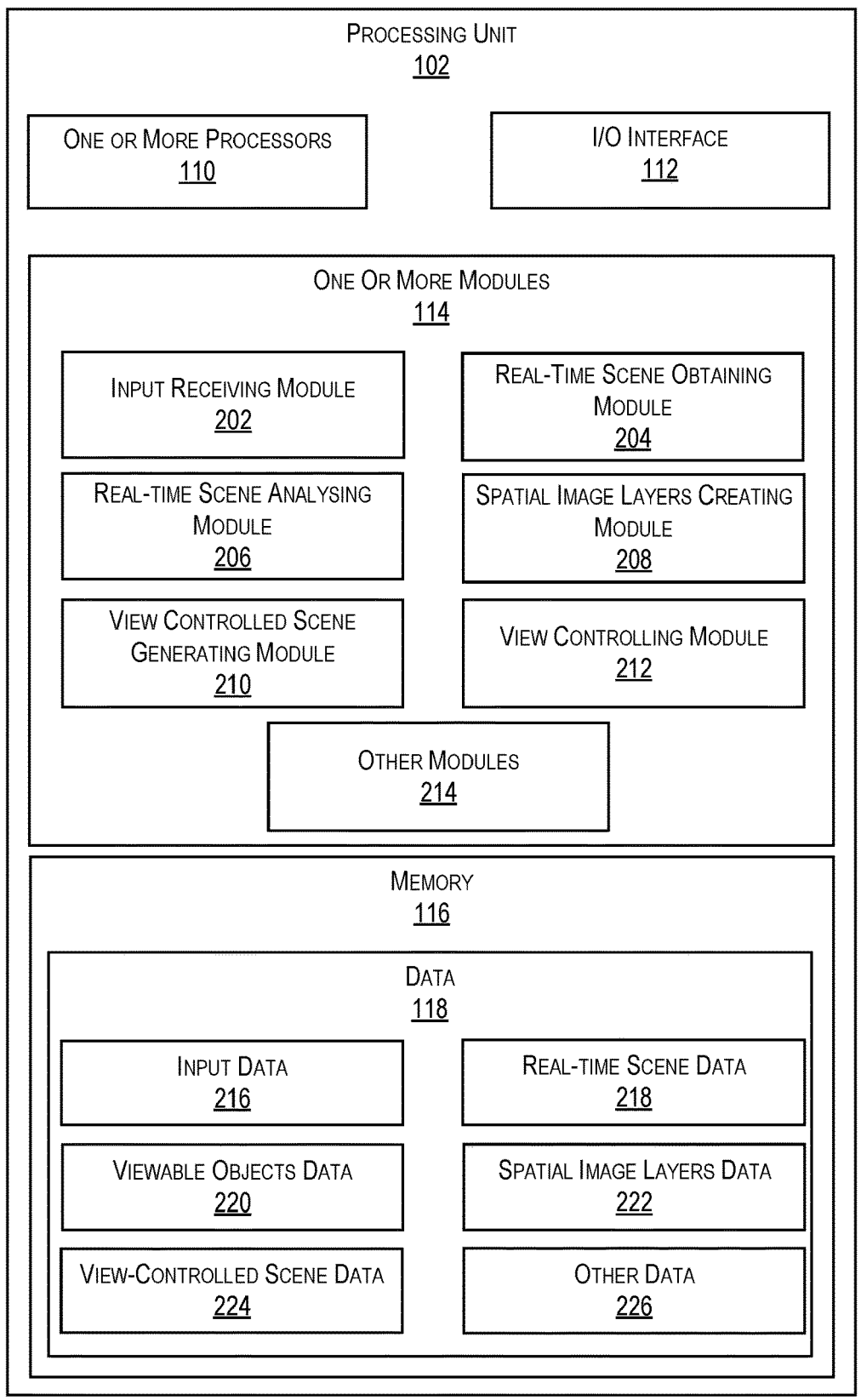
FIG. 2 illustrates a detailed block diagram showing functional modules of a processing unit for controlling field of view of a user in an immersive environment, in accordance with an embodiment of the present invention.

FIG. 2 shows a detailed block diagram of the processing unit 102 for rendering the modified scene to the user, in accordance with some non-limiting embodiments or aspects of the present disclosure. The processing unit 102 may include one or more processors 110, an Input/Output (I/O) interface 112, one or more modules 114, and a memory 116. In some non-limiting embodiments or aspects, the memory 116 may be communicatively coupled to the one or more processors 112. The memory 116 stores instructions, executable by the one or more processors 112, which on execution, may cause the processing unit 102 to control the field of view of the user. In some non-limiting embodiments or aspects, the memory 116 may include data 118. The one or more modules 114 may be configured to perform the steps of the present disclosure using the data 118 to control the field of view of the user. In some non-limiting embodiments or aspects, each of the one or more modules 114 may be a hardware unit, which may be outside the memory 116 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 114 may be implemented with a cloud-based server, communicatively coupled with the processing unit 102.

The data 118 in the memory 116 and the one or more modules 114 of the processing unit 102 are described herein in detail. In one implementation, the one or more modules 114 may include but is not limited to, an input receiving module 202, a real-time scene obtaining module 204, a real-time scene analyzing module 206, a spatial image layers creating module 208, a view-controlled scene generating module 210, a view controlling module 212 and one or more other modules 214 associated with the processing unit 102. In some non-limiting embodiments or aspects, the data 118 in the memory 116 may include input data 216 (herewith also referred to as input 216), real-time scene data 218 (herewith also referred to as real-time scene 218), viewable objects data 220 (herewith also referred to as one or more viewable objects 220), spatial image layers data 222 (herewith also referred to as plurality of spatial image layers 222, view-controller scene data 224 (herewith also referred to as view controlled scene 224) and other data 226 associated with the processing unit 102.

In some non-limiting embodiments or aspects, the data 118 in the memory 116 may be processed by the one or more modules 114 of the processing unit 102. In some non-limiting embodiments or aspects, the one or more modules 114 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 114 of the present disclosure renders the view-controlled scene to the at least one user amongst the plurality of users 106. The one or more modules 114 along with the data 118, may be implemented in any system for controlling the field of view of the user in the immersive environment.

Figure 3A:
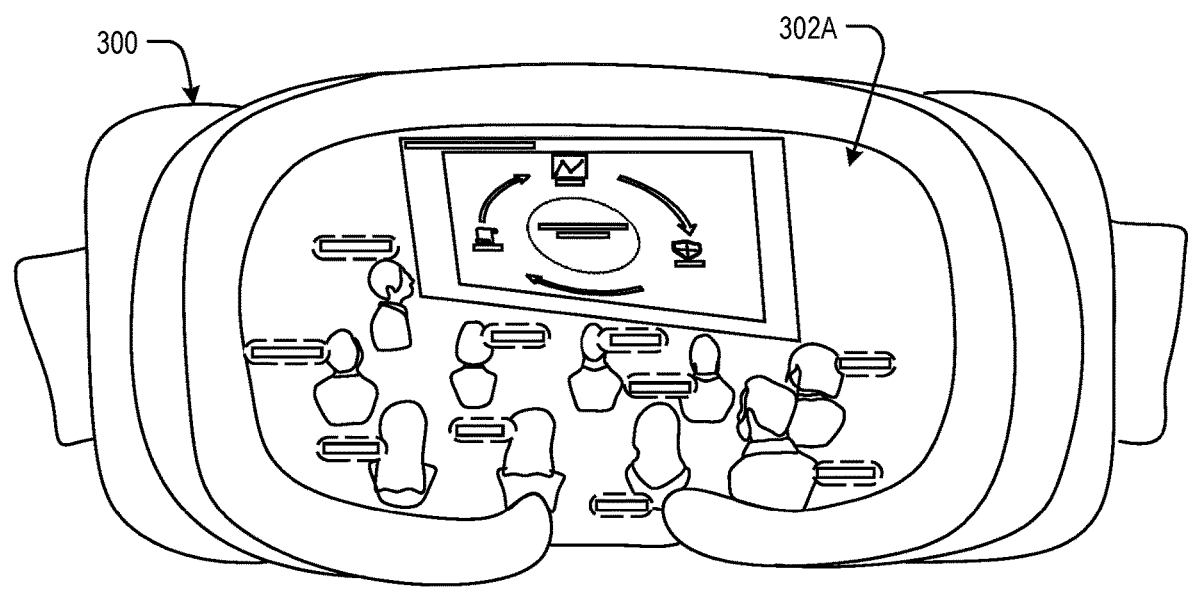
FIGS. 3A-3F show exemplary embodiments for controlling field of view of a user in an immersive environment, in accordance with an embodiment of the present invention.
Figure 3B:
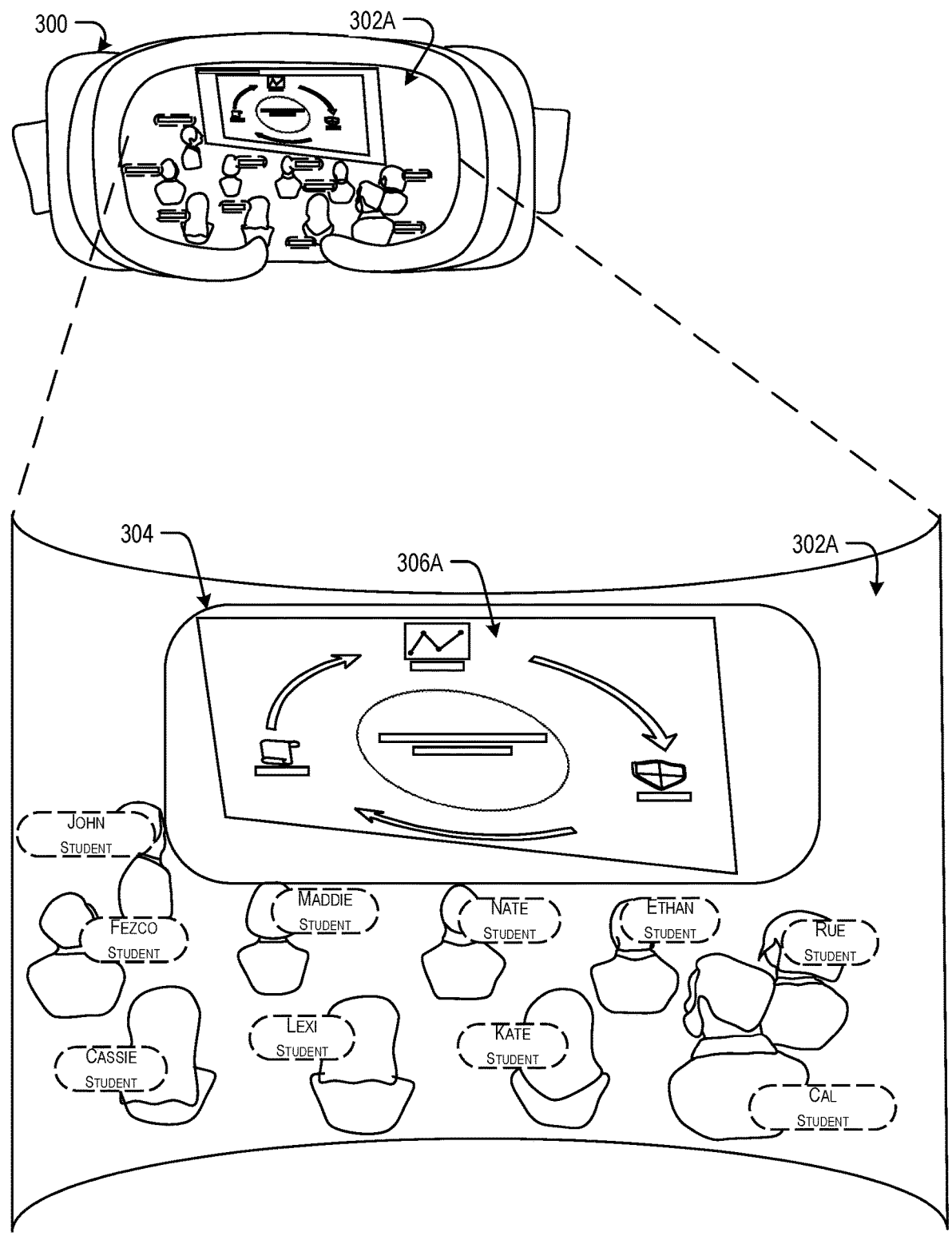

In the immersive environment with a presenter 106A and one or more attendees 106B, the content rendered to the one or more attendees 106B may comprise scenes presented sequentially within field of view of the one or more attendees 106B. The content to be presented to the one or more attendees 106B may be generated using the instructions provided by the presenter 106B. For example, consider the immersive environment is a classroom scenario with a lecturer and students as shown in FIG. 3A. The immersive environment may be experienced by the lecturer and the students using a user device such as a Virtual Reality (VR) headset. Each of the lecturer and the students may wear the headset to view the content of the immersive environment. As shown in FIG. 3A, a real-time scene 302A of a classroom may include a projector with information related to subject matter taught by the lecturer and graphical figures or representation of students and lecturer. In the present invention, the presenter is provisioned with an option to provide an input for controlling the field of view of at least one attendee. The input may be in form of an aperture with a predefined space. In an embodiment, the presenter may also be able to select attendees whose field of view is to be controlled. In an embodiment, the inputs include the aperture and information about the selected attendees amongst the one or more attendees 106B of the immersive environment. An exemplary representation of an aperture 304 inputted by the presenter is shown in FIG. 3B. In the example, the aperture may be a virtual aperture drawn by the presenter or graphical representation of the aperture selected by the presenter.

Once the aperture is inputted by the presenter 106A, the input receiving module 202, may be configured to receive the input and identify the aperture. In an embodiment, the input is analyzed by the input receiving module 202 to identify information related to the aperture. The information may include but is not limited to, list of attendees whose field of view is to be controlled, placement of the aperture within the field of view, shape of the aperture, time period for controlling the field of view and so on. One or more other information related to controlling the field of view may be extracted from the input. The input receiving module 202 may receive the input from the input extractions unit 108.

Upon receiving the input from the presenter 106A, the real-time scene obtaining module 204 may be configured to dynamically obtain a real-time scene indicating current field of view of the at least one attendee within the immersive environment. In an embodiment, when the content to be presented to the one or more attendees 106B is pre-defined and stored in a database, the real-time scene may be obtained from the database, prior to presenting to the one or more attendees 106B. The real-time scene at every instant of time, throughput the rendering of the content, is obtained dynamically, for analyzing and controlling the field of view. For the scenario illustrated in FIG. 3A and FIG. 3B, the real-time scene 302A may be obtained.

Further, the real-time scene analyzing module 206 may be configured to analyze the real-time scene. The real-time scene is analyzed based on the input received from the presenter. The real-time scene is analyzed to identify one or more viewable objects within the real-time scene. In an embodiment, the one or more viewable object may be objects that are displayed within boundary of the aperture.

Consider the aperture 304, in FIG. 3B, for the real-time scene 302A. The one or more viewable objects may be object 306A, which is the projector with data related to subject matter taught in the immersive environment. In an embodiment, during rendering of the content, the real-time scene of the at least one attendee, keep varying at every instant of time. The real-time scene may vary based on the content presented by the presenter or based on change in field of view of the at least one attendee. The real-time scene at every instant of time is obtained and analyzed to identify the one or more viewable object at that instant of time.

Based on the aperture, the one or more viewable objects and one or more additional objects, the spatial image layers creating module 208 may be configured to create plurality of spatial image layers for the real-time scene. Upon creating the plurality of spatial image layers, the view-controlled scene generating module 210 may be configured to generate a view-controlled scene for the at least one attendee. The view-controlled scene may be created by sequentially combining the plurality of spatial image layers. Further, the view-controlled scene is replaces the real-time scene by the view controlling module 212 for provisioned controlled view to the at least one attendee.

In an embodiment, the plurality of spatial image layers may include three or more layers. A first image layer of the plurality of spatial image layers may comprise the aperture with the predefined shape and the one or more viewable objects within the aperture. A second image layer of the plurality of spatial image layers may comprise remaining objects, other than the one or more viewable objects, of the real-time scene. The second image layer restricts view of the remaining objects to the at least one attendee. The second image layer may be one of blurred image, monochrome image and blacked out image. A third image layer of the plurality of spatial image layers comprises the one or more additional objects.

Figure 3C:
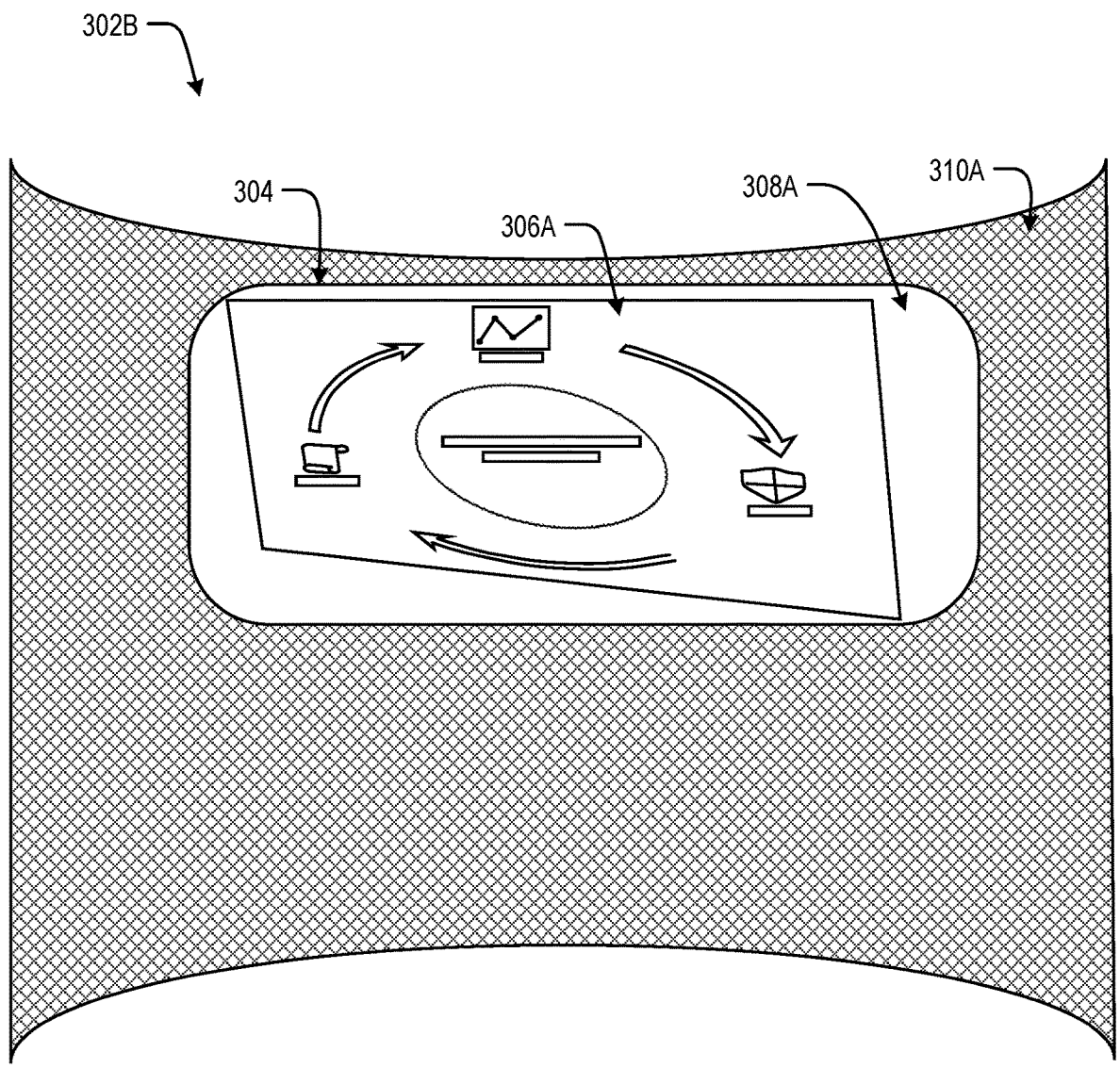
Figure 3D:
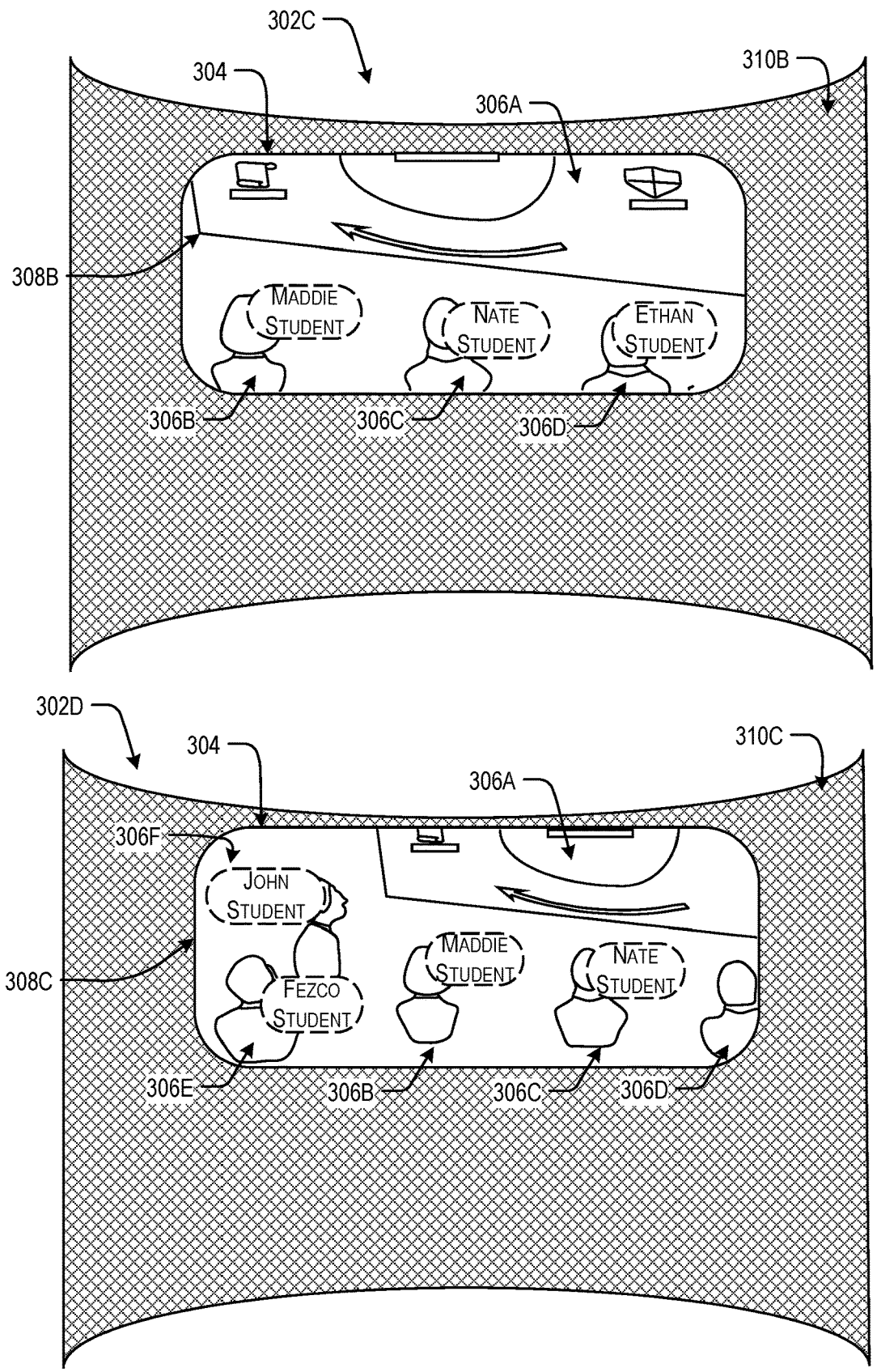

An exemplary representation of view-controlled scenes is shown in FIG. 3C and FIG. 3D. When the one or more viewable objects are identified to be object 306A, the view-controlled scene 302B, as shown in FIG. 3C may be generated with a first image layer 308A and a second image layer 310A. Referring to FIG. 3D. When the one or more viewable objects are identified to be objects 306A, 306B, 306C and 306D, the view-controlled scene 302C may be generated with a first image layer 308B and a second image layer 310B. When the one or more viewable objects are identified to be objects 306A, 306B, 306C, 306D, 306E and 306F, the view-controlled scene 302D may be generated with a first image layer 308C and a second image layer 310C.

Figure 3E:
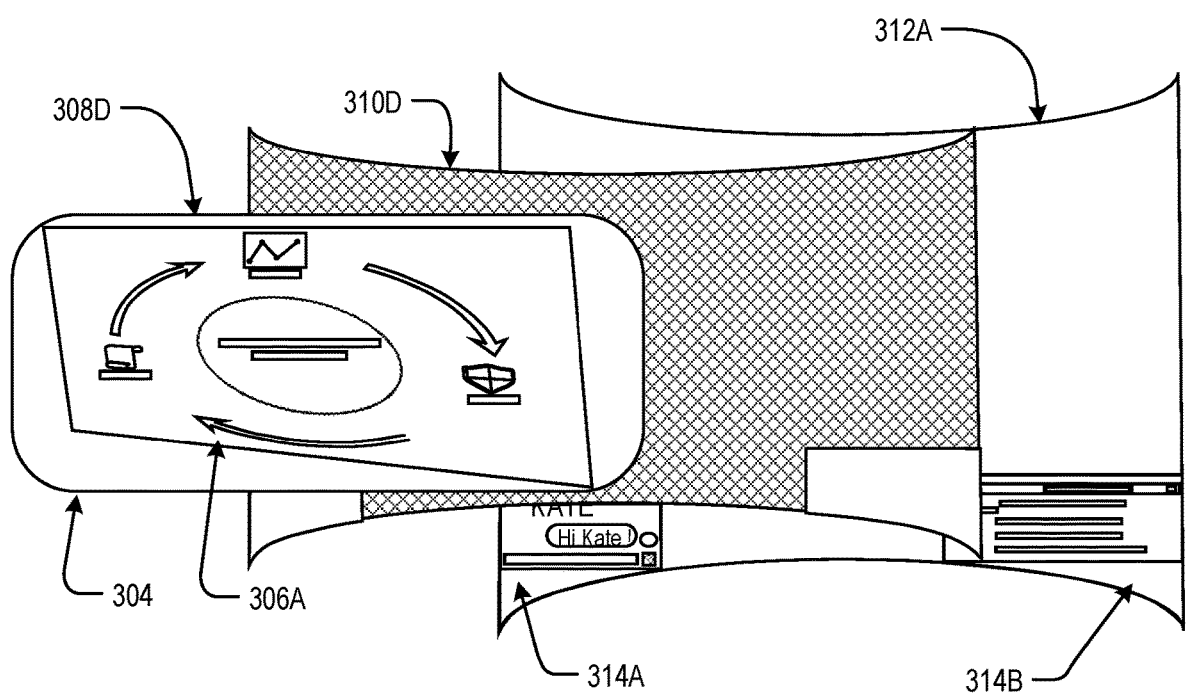
Figure 3F:
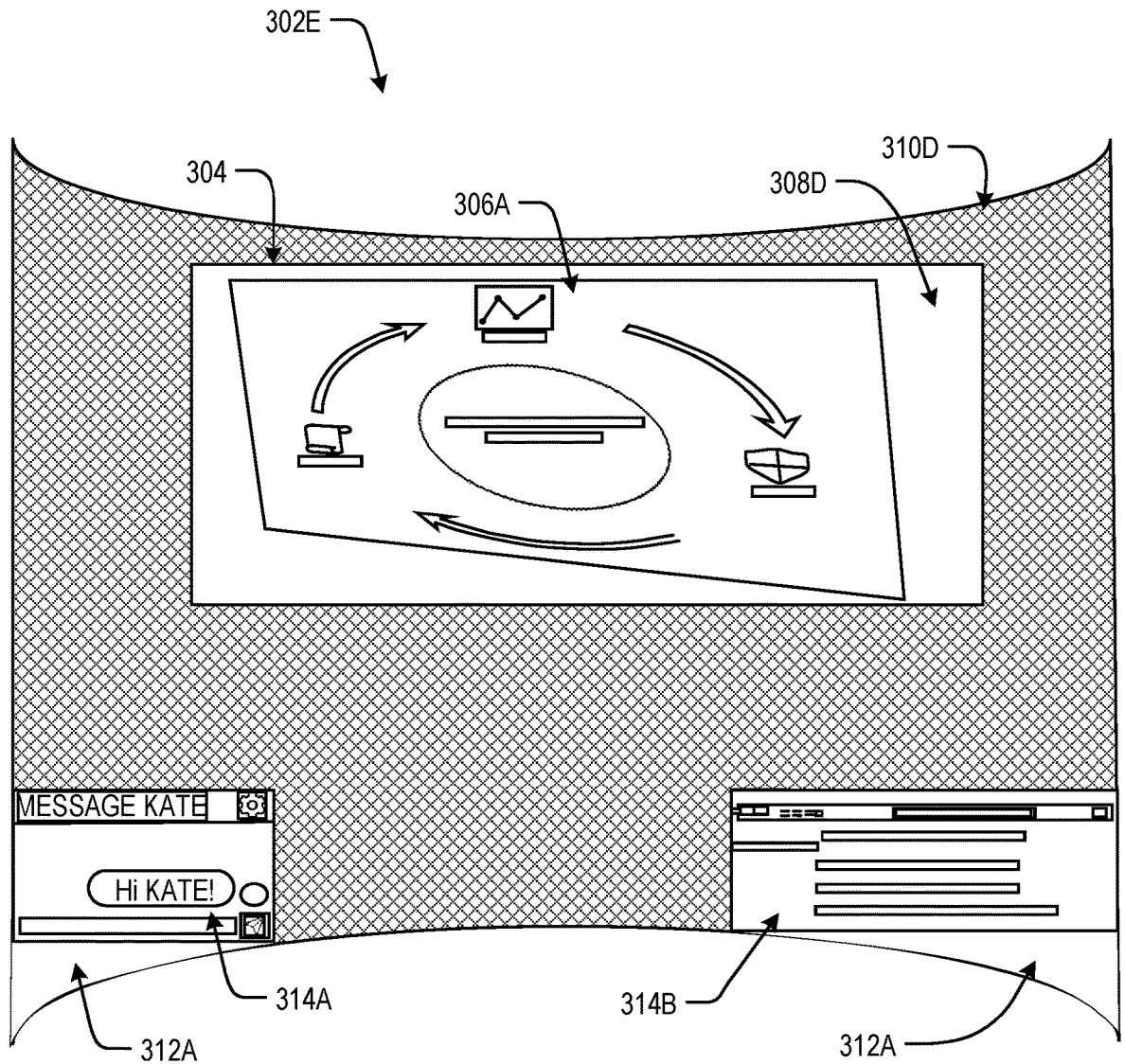

Consider a view-controlled scene generated using a first image layer 308D, a second image layer 310D and a third image layer 312A. As described previously, the first image layer 308D comprises the aperture 304 with the predefined shape and the one or more viewable objects 306A within the aperture 304. The second image layer 310D comprises remaining objects, other than the one or more viewable objects, of the real-time scene. The second image layer 310D restricts view of the remaining objects to the at least one attendee. The second image layer 310D may be one of blurred image, monochrome image and blacked out image. The third image layer 312A of the plurality of spatial image layers comprises the one or more additional objects 314A and 314B. In an embodiment, as shown in FIG. 3E, when sequentially combining the plurality of spatial image layers 308D, 310D and 312A to generate the view-controlled scene, the first image layer 308D may be placed proximal to the at least one attendee, amongst other layers of the plurality of spatial image layers. In an embodiment, additional spatial image layers may be generated based on objects to be displayed to the at least one attendee. For example, each of the additional objects 314A and 314B may be associated with a dedicated spatial image layer. FIG. 3F shows a view-controlled scene 302E generated using the plurality of spatial image layers 308D, 310D and 312A. The view-controlled scene 302E displays the viewable object 306A and the additional objects 314A and 314B to the at least one attendee.

Figure 4:
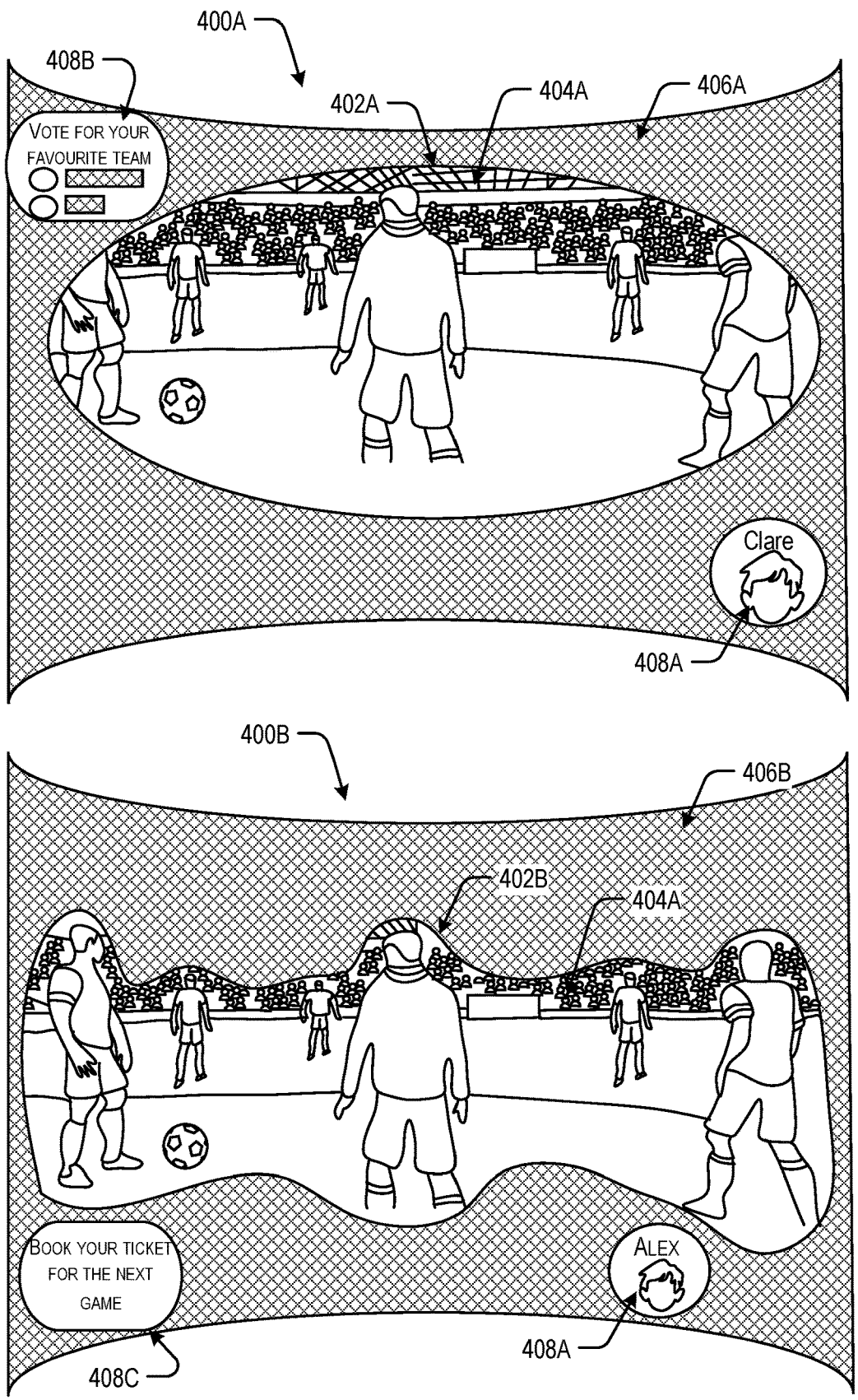

Consider immersive environment of live-telecast of a game as shown in FIG. 4. The aperture inputted by the presenter (who may be a broadcaster in this scenario) may be varied during rendering of the content to the at least one attendee. Aperture 402A of view-controlled scene 400A may be changes to aperture 402B of view-controlled scene 400B. The view-controlled scene 400A may comprise the aperture 402A, first image layer 404A, second image layer 406A and additional objects 408A and 408B. The view-controlled scene 400B may comprise the aperture 402B, first image layer 404B, second image layer 406B and additional objects 408C and 408D. The one or more viewable objects may vary based on the shape of the aperture.

Figure 5A:
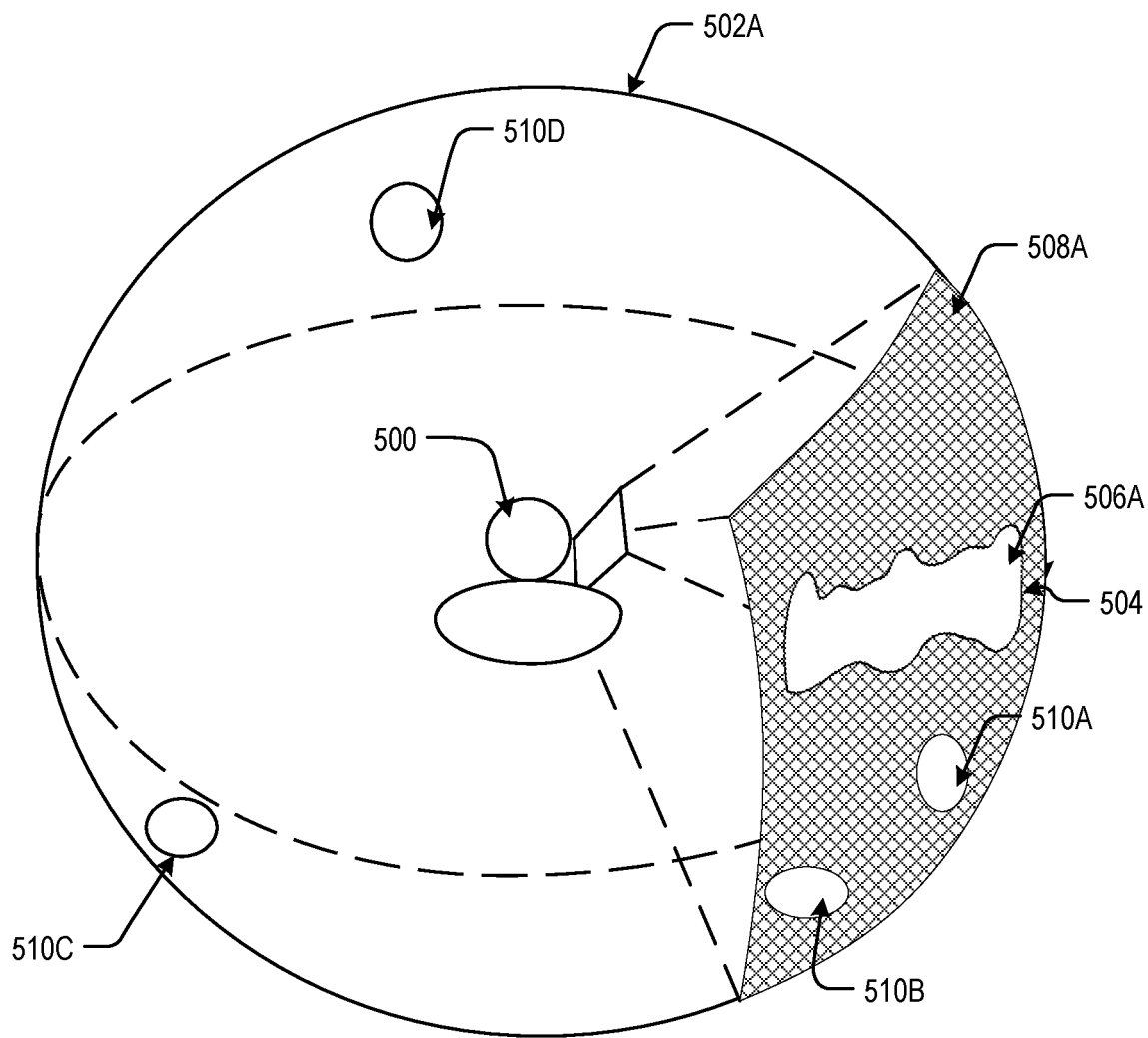
FIG. 5A shows the view of a user in 360° view, in accordance with an embodiment of the present invention.
Figure 5B:
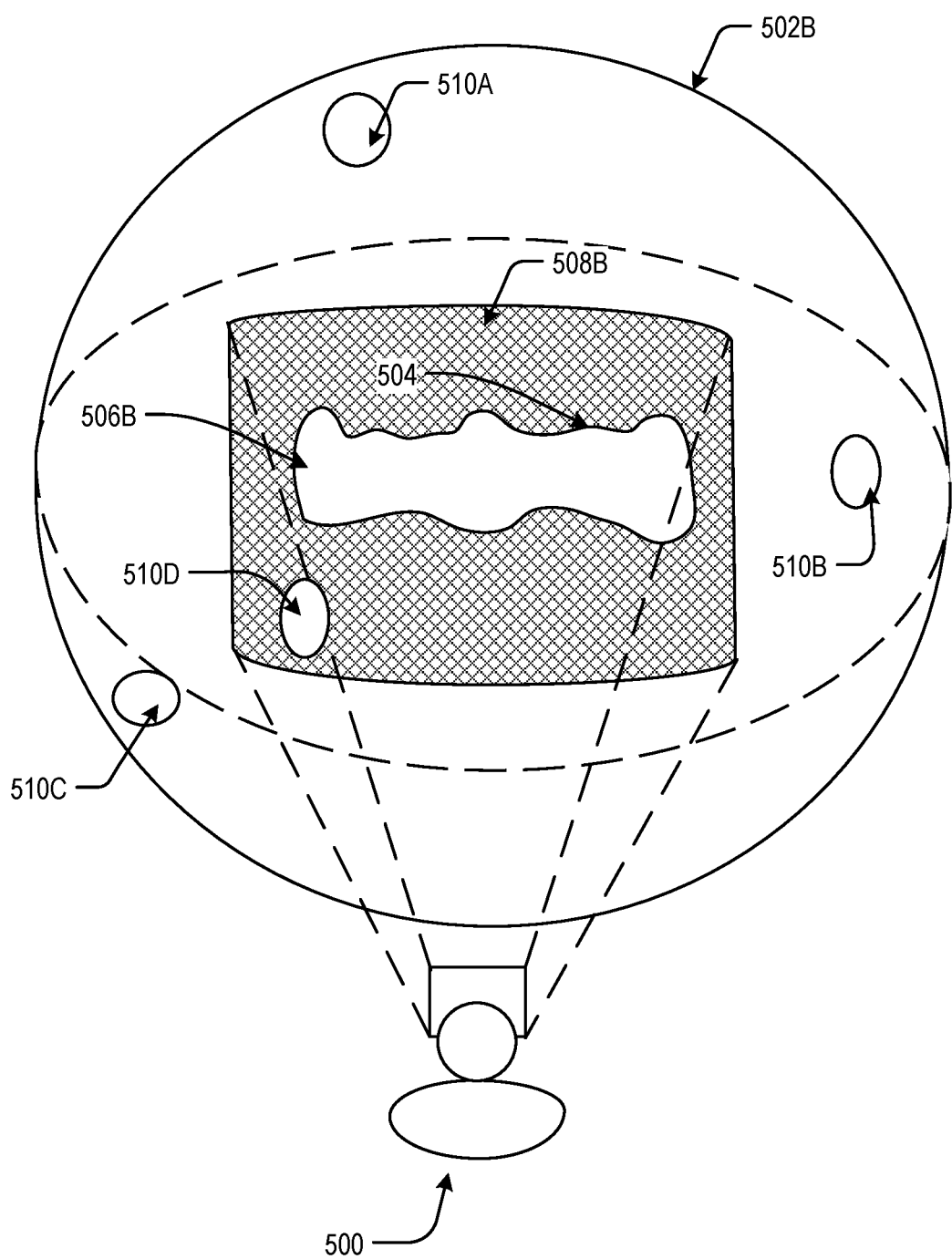
FIG. 5B shows a spherical field of view from outside the sphere, in accordance with an embodiment of the present invention.

In an embodiment, when the view of the at least one attendee is 360° view, the current field of view may be a spherical view from within sphere as shown in FIG. 5A. In 360° view 502A, the user 500 views the scene from inside the sphere. The 360° view 502A may include an aperture 504, first image layer 506A, second image layer 508A, additional objects 510A, 510B, 510C and 510D. In another embodiment, the current field of view may be a spherical view from outside the sphere as shown in FIG. 5B. In 360° view 502B, the user 500 views the scene from outside the sphere. The 360° view 502B may include an aperture 504, first image layer 506B, second image layer 508B, additional objects 510A, 510B, 510C and 510D. Using the processing unit 102, the presenter may be able to control the current field of view of the user, irrespective of the view.

Figure 6:
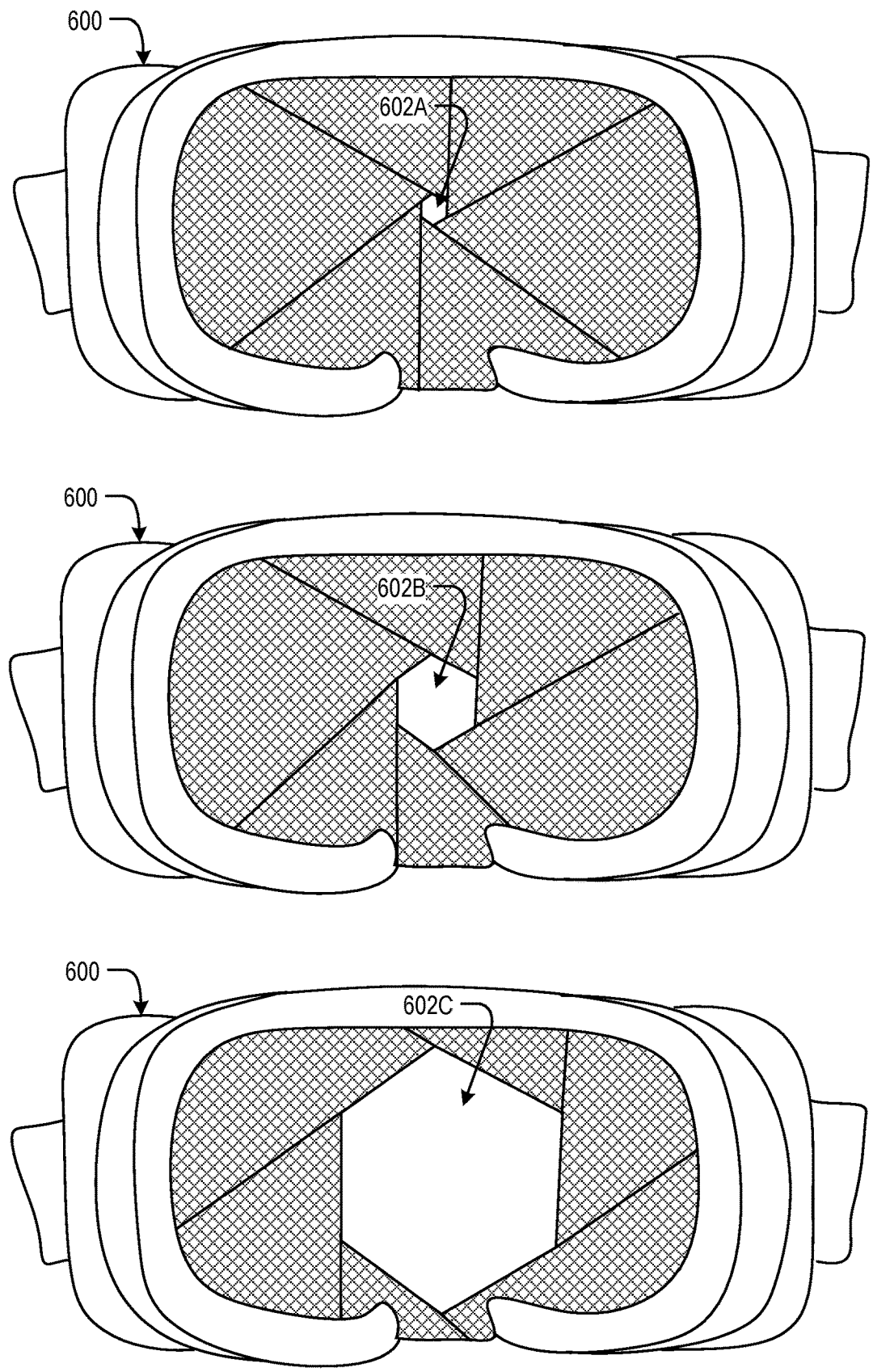
FIG. 6 shows an exemplary embodiment of an aperture embedded with a user device of a user for controlling field of view of the user in an immersive environment, in accordance with an embodiment of the present invention.

In an embodiment, the aperture may be a physical entity embedded with a wearable of the at least one attendee. An exemplary representation of the aperture as the physical entity is shown in FIG. 6. In a headset 600 worn by the at least one attendee, the physical entity may move to create the aperture as desired by the presenter. Apertures 602A, 602B and 602C may be created using the input provided by the presenter. The physical entity may move towards the center of headset to create a smaller aperture. The physical entity may move away from the center of headset to create a lagger aperture. One or more other form of physical entity, known to a person skilled in the art, may be embedded with the headset to create the desired aperture.

In some non-limiting embodiments or aspects, the processing unit 102 may receive data for controlling field of view of the at least one attendee via the I/O interface 112. The received data may include, but is not limited to, at least one of the input 216, the real-time scene 218 and the like. Also, the processing unit 102 may transmit data for controlling field of view of the at least one attendee via the I/O interface 112. The transmitted data may include, but is not limited to, the view-controlled scene 224, and the like.

The other data 226 may comprise data, including temporary data and temporary files, generated by modules for performing the various functions of the processing unit 102. The one or more modules 114 may also include other modules 214 to perform various miscellaneous functionalities of the processing unit 102. It will be appreciated that such modules may be represented as a single module or a combination of different modules.

In an embodiment, inputs and selections of the plurality of users 106 may be utilized to train the one or more modules 114 to dynamically create the view-controlled scene. Further, the view-controlled scene may replace the real-time scene for the provisioned controlled view to the at least one attendee.

Some non-limiting embodiments or aspects of the present disclosure focuses on provisioning an option to the presenter to control the field of view of the user. The presenter obtains the authority to choose the view of the attendees using the present invention. Further, the presenter is provided with an flexibility to choose the shape and size of the aperture.

Figure 7:
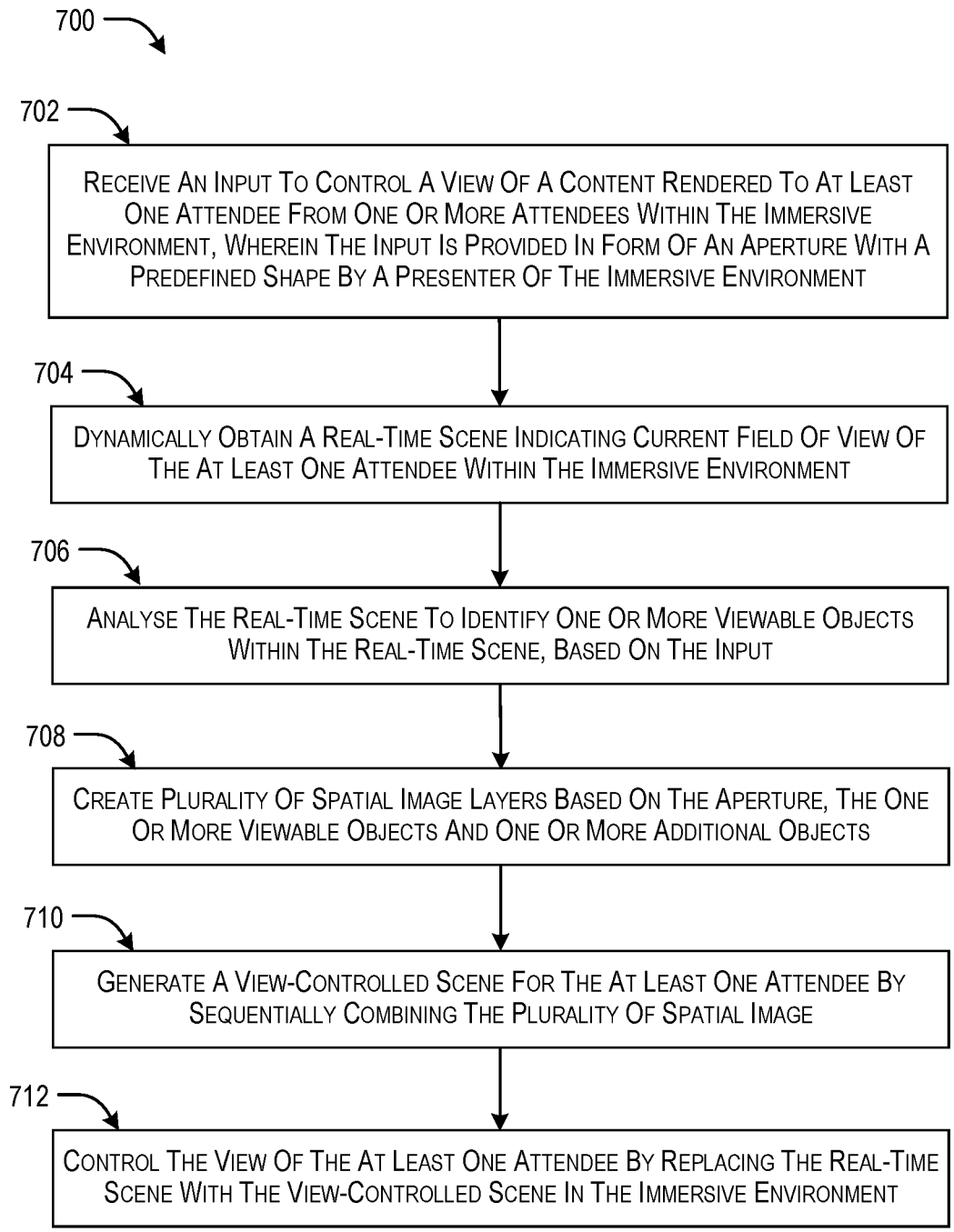
FIG. 7 is an exemplary process of processing unit for controlling field of view of the user in an immersive environment, in accordance with an embodiment of the present invention.

FIG. 7 shows an exemplary process of a processing unit 102 for controlling field of view of the user in an immersive environment, in accordance with an embodiment of the present disclosure. Process 700 for controlling the view of the user includes steps coded in form of executable instructions to be executed by a processing unit associated with the immersive environment with the at least one presenter and the one or more attendees.

At block 702, the processing unit may be configured to receive an input to control a view of a content rendered to at least one attendee from one or more attendees within the immersive environment. The input is provided in form of an aperture with a predefined shape by a presenter of the immersive environment. In an embodiment, the aperture may be one of a virtual aperture drawn by the presenter, a graphical representation selected by the presenter or a physical entity embedded with a wearable of the at least one attendee. In an embodiment, when the view of the at least one attendee is 360° view, the current field of view is a spherical view from one of within sphere and outside the sphere of the 370° view.

At block 704, the processing unit may be configured to dynamically obtain a real-time scene indicating current field of view of the at least one attendee within the immersive environment.

At block 706, the processing unit may be configured to analyze the real-time scene to identify one or more viewable objects within the real-time scene, based on the input.

At block 708, the processing unit may be configured to create plurality of spatial image layers based on the aperture, the one or more viewable objects and one or more additional objects. A first image layer of the plurality of spatial image layers comprises the aperture with the predefined shape and the one or more viewable objects within the aperture. A second image layer of the plurality of spatial image layers comprises remaining objects, other than the one or more viewable objects, of the real-time scene. The second image layer restricts view of the remaining objects to the at least one attendee. The second image layer is one of blurred image, monochrome image and blacked out image. A third image layer of the plurality of spatial image layers comprises the one or more additional objects.

At block 710, the processing unit may be configured to generate a view-controlled scene for the at least one attendee by sequentially combining the plurality of spatial image layers. The view-controlled scene comprises the first image layer proximal to the at least one attendee, amongst other layers of the plurality of spatial image layers.

At block 712, the processing unit may be configured to control the view of the at least one attendee by replacing the real-time scene with the view-controlled scene in the immersive environment.

As illustrated in FIG. 7, the method 700 may include one or more steps for executing processes in the processing unit 102. The method 700 may be described in the general context of computer executable instructions. Generally, computer executable instructions can include routines, programs, objects, components, data structures, procedures, modules, and functions, which perform particular functions or implement particular abstract data types.

The order in which steps in the method 700 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Figure 8:
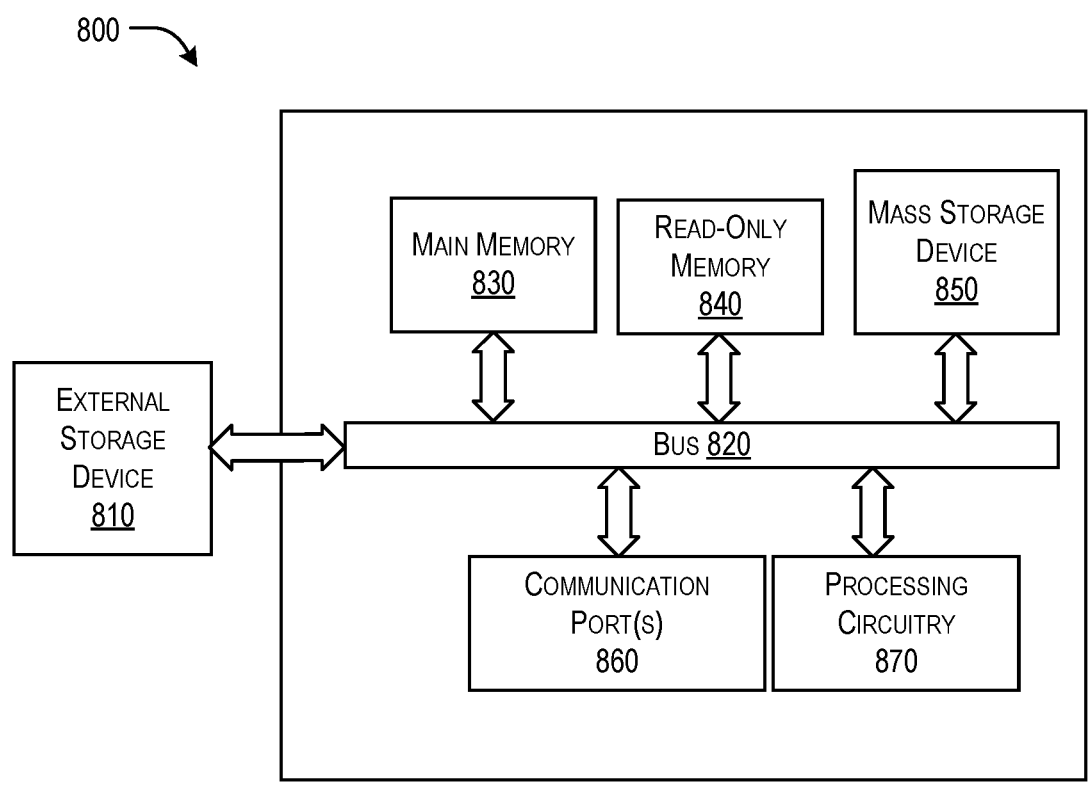
FIG. 8 illustrates an exemplary computer unit in which or with which embodiments of the present invention may be utilized.

FIG. 8 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps or the steps may be performed by a combination of hardware, software and/or firmware. As shown in FIG. 8, the computer system 800 includes an external storage device 810, bus 820, main memory 830, read-only memory 840, mass storage device 850, communication port(s) 860, and processing circuitry 870.

Those skilled in the art will appreciate that the computer system 800 may include more than one processing circuitry 870 and one or more communication ports 860. The processing circuitry 870 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 870 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 870 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 870 may include various modules associated with embodiments of the present disclosure.

The communication port 860 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 860 may be any RS-232 port for use with a modem-based dialup connection, a 10/100 Ethernet port, a Gigabit, or a 10 Gigabit port using copper or fiber, a serial port, a parallel port, or other existing or future ports. The communication port 860 may be chosen depending on a network, such as a Local Area Network (LAN), Wide Area Network (WAN), or any network to which the computer system 800 may be connected.

The main memory 830 may include Random Access Memory (RAM) or any other dynamic storage device commonly known in the art. Read-only memory (ROM) 840 may be any static storage device(s), e.g., but not limited to, a Programmable Read-Only Memory (PROM) chips for storing static information, e.g., start-up or BIOS instructions for the processing circuitry 870.

The mass storage device 850 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 830. The mass storage device 850 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 820 communicatively couples the processing circuitry 870 with the other memory, storage, and communication blocks. The bus 820 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 870 to the software system.

Optionally, operator and administrative interfaces, e.g., a display, keyboard, and a cursor control device, may also be coupled to the bus 820 to support direct operator interaction with the computer system 800. Other operator and administrative interfaces may be provided through network connections connected through the communication port(s) 860. The external storage device 810 may be any kind of external hard drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 800 may be accessed through a user interface. The user interface application may be implemented using any suitable architecture. For example, it may be a stand-alone application wholly implemented on the computer system 800. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 800 is retrieved on-demand by issuing requests to a server remote to the computer system 800. For example, computer system 800 may receive inputs from the user via an input interface and transmit those inputs to the remote server for processing and generating the corresponding outputs. The generated output is then transmitted to the computer system 800 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . .

. and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed:

1. A method for controlling field of view of a user in an immersive environment, the method comprises:
   receiving, by a processing unit, an input to control a view of a content rendered to at least one attendee from one or more attendees within the immersive environment, wherein the input is provided in form of an aperture with a predefined shape by a presenter of the immersive environment;
   dynamically obtaining, by the processing unit, a real-time scene indicating current field of view of the at least one attendee within the immersive environment;
   analysing, by the processing unit, the real-time scene to identify one or more viewable objects within the real-time scene, based on the input;
   creating, by the processing unit, plurality of spatial image layers based on the aperture, the one or more viewable objects and one or more additional objects, wherein a first image layer of the plurality of spatial image layers comprises the aperture with the predefined shape and the one or more viewable objects within the aperture, a second image layer of the plurality of spatial image layers comprises remaining objects, other than the one or more viewable objects, of the real-time scene, said second image layer includes at least one of: blurred image, monochrome image and blacked out image to restrict view of the remaining objects to the at least one attendee, wherein a third image layer of the plurality of spatial image layers comprises the one or more additional objects;
   generating, by the processing unit, a view-controlled scene for the at least one attendee by sequentially combining the plurality of spatial image; and
   controlling, by the processing unit, the view of the at least one attendee by replacing the real-time scene with the view-controlled scene in the immersive environment.

2. The method of claim 1, wherein, when the view of the at least one attendee is 3600 view, the current field of view is a spherical view from one of within sphere and outside the sphere of the 3600 view.

3. The method of claim 1, wherein the view-controlled scene comprises the first image layer proximal to the at least one attendee, amongst other layers of the plurality of spatial image layers.

4. The method of claim 1, wherein the aperture is at least one of a virtual aperture drawn by the presenter, a graphical representation selected by the presenter or a physical entity embedded with a wearable of the at least one attendee.

5. A processing unit for controlling field of view of a user in an immersive environment, the processing unit comprises:
   one or more processors; and
   a memory communicatively coupled to the one or more processors, wherein the memory stores processor-executable instructions, which, on execution, cause the one or more processors to:
   receive an input to control a view of a content rendered to at least one attendee from one or more attendees within the immersive environment, wherein the input is provided in form of an aperture with a predefined shape by a presenter of the immersive environment;
   dynamically obtain a real-time scene indicating current field of view of the at least one attendee within the immersive environment;
   analyse the real-time scene to identify one or more viewable objects within the real-time scene, based on the input;
   create plurality of spatial image layers based on the aperture, the one or more viewable objects and one or more additional objects, wherein a first image layer of the plurality of spatial image layers comprises the aperture with the predefined shape and the one or more viewable objects within the aperture, a second image layer of the plurality of spatial image layers comprises remaining objects, other than the one or more viewable objects, of the real-time scene, said second image layer includes at least one of: blurred image, monochrome image and blacked out image to restrict view of the remaining objects to the at least one attendee, wherein a third image layer of the plurality of spatial image layers comprises the one or more additional objects;
   generate a view-controlled scene for the at least one attendee by sequentially combining the plurality of spatial image; and
   control the view of the at least one attendee by replacing the real-time scene with the view-controlled scene in the immersive environment.

6. The processing unit of claim 5, wherein, when the view of the at least one attendee is 3600 view, the current field of view is a spherical view from one of within sphere and outside the sphere of the 3600 view.

7. The processing unit of claim 5, wherein the view-controlled scene comprises the first image layer proximal to the at least one attendee, amongst other layers of the plurality of spatial image layers.

8. The processing unit of claim 5, wherein the aperture is at least one of a virtual aperture drawn by the presenter, a graphical representation selected by the presenter or a physical entity embedded with a wearable of the at least one attendee.

9. A non-transitory computer-readable medium including instructions stored thereon that when processed by one or more processors cause a system to perform operations comprising:
   receiving an input to control a view of a content rendered to at least one attendee from one or more attendees within the immersive environment, wherein the input is provided in form of an aperture with a predefined shape by a presenter of the immersive environment;

dynamically obtaining a real-time scene indicating current field of view of the at least one attendee within the immersive environment;

analysing the real-time scene to identify one or more viewable objects within the real-time scene, based on the input;

creating plurality of spatial image layers based on the aperture, the one or more viewable objects and one or more additional objects, wherein a first image layer of the plurality of spatial image layers comprises the aperture with the predefined shape and the one or more viewable objects within the aperture, a second image layer of the plurality of spatial image layers comprises remaining objects, other than the one or more viewable objects, of the real-time scene, said second image layer includes at least one of: blurred image, monochrome image and blacked out image to restrict view of the remaining objects to the at least one attendee, wherein a third image layer of the plurality of spatial image layers comprises the one or more additional objects;

generating a view-controlled scene for the at least one attendee by sequentially combining the plurality of spatial image; and controlling the view of the at least one attendee by replacing the real-time scene with the view-controlled scene in the immersive environment.

10. The non-transitory computer-readable medium of claim 9, wherein, when the view of the at least one attendee is 3600 view, the current field of view is a spherical view from one of within sphere and outside the sphere of the 3600 view.

11. The non-transitory computer-readable medium of claim 9, wherein the view-controlled scene comprises the first image layer proximal to the at least one attendee, amongst other layers of the plurality of spatial image layers.

12. The non-transitory computer-readable medium of claim 9, wherein the aperture is one of a virtual aperture drawn by the presenter, a graphical representation selected by the presenter or a physical entity embedded with a wearable of the at least one attendee.

* * * * *